United States Patent
Hashimoto

(10) Patent No.: US 8,322,609 B2
(45) Date of Patent: Dec. 4, 2012

(54) IMAGE FORMING APPARATUS AND CONTROL METHOD OF IMAGE FORMING APPARATUS

(75) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 12/624,033

(22) Filed: Nov. 23, 2009

(65) Prior Publication Data

US 2010/0127076 A1 May 27, 2010

(30) Foreign Application Priority Data

Nov. 26, 2008 (JP) .................................. 2008-301216

(51) Int. Cl.
*G06K 5/00* (2006.01)
*G06K 15/22* (2006.01)
*G06F 17/00* (2006.01)
*G06F 1/00* (2006.01)
*G03G 21/00* (2006.01)
*G03G 15/00* (2006.01)

(52) U.S. Cl. ............ 235/382; 235/375; 399/75; 399/80; 399/81; 399/88; 399/89; 358/1.4; 713/300; 713/310; 713/320

(58) Field of Classification Search .................. 235/375, 235/382; 399/75–89; 358/1.4; 713/300, 713/310, 320
See application file for complete search history.

(56) References Cited

U.S. PATENT DOCUMENTS

| 2003/0053111 A1* | 3/2003 | Endo ........................... 358/1.14 |
| 2005/0271410 A1* | 12/2005 | Namizuka et al. .............. 399/75 |
| 2006/0029412 A1 | 2/2006 | Kato |
| 2008/0197191 A1* | 8/2008 | Watanabe et al. ............. 235/382 |

FOREIGN PATENT DOCUMENTS

JP 2006-47765 A 2/2006

* cited by examiner

*Primary Examiner* — Michael G Lee
*Assistant Examiner* — Laura Gudorf
(74) *Attorney, Agent, or Firm* — Canon USA, Inc., IP Division

(57) ABSTRACT

An image forming apparatus includes a power supply unit supplying power to a plurality of components, the power supply unit including a first power mode and a second power mode, the second power mode supplying less power than the first power mode, a control unit controlling which power mode the power supply unit uses, an authentication unit performing a user authentication when power is supplied from the power supply unit in the second power mode and an authentication request received in the second power mode, and a sending unit sending a request signal requesting the control unit to shift the power supply unit to the first power mode when the authentication unit succeeds in the user authentication, wherein the control unit controls the power supply unit to shift from the second power mode to the first power mode upon receipt of the request signal.

14 Claims, 16 Drawing Sheets

FIG.12

|  | CARD TYPE | VENDOR NAME | SERIAL NO. | VERSION |
|---|---|---|---|---|
| SAMPLE OF VALUES | TypeA | A | A000233 | 1.01 |

FIG.13

|  | GROUP CODE | ORGANIZATION CODE | INDIVIDUAL CODE |
|---|---|---|---|
| SAMPLE OF VALUES | 0033 | 0124 | 00011238 |

FIG.14

| AUTHENTICABLE DATA ARRAY |
|---|
| 00000111 |
| 00000112 |
| 00000115 |
| 00000118 |
| 00000122 |
| 00000127 |
| 00000128 |
| 00000129 |
| ⋮ |
| 00011235 |
| 00011236 |
| 00011237 |
| 00011239 |
| 00011240 |
| EOF |

FIG.15

| UNAUTHENTICABLE DATA ARRAY |
|---|
| 00000113 |
| 00000114 |
| 00000116 |
| 00000117 |
| 00000119 |
| 00000120 |
| 00000121 |
| 00000123 |
| 00000124 |
| 00000125 |
| 00000126 |
| 00000127 |
| EOF |

FIG.16

| NUMBER | CARD TYPE | GROUP CODE | INDIVIDUAL CODE | AUTHENTICATION RESULT |
|---|---|---|---|---|
| 1 | TypeA | 0033 | 00000115 | OK |
| 2 | TypeA | 0033 | 00000122 | OK |
| 3 | TypeA | 0033 | 00000111 | OK |
| 4 | TypeA | 0033 | 00000117 | NG |
| 5 | TypeA | 0033 | 00000122 | OK |
| 6 | TypeA | 0002 | 00113120 | NG |
| 7 | TypeA | 0033 | 00000121 | OK |
| 8 | TypeC | 0033 | 00000112 | NG |
| 9 | TypeA | 0033 | 00000124 | OK |
| 10 | TypeA | 0033 | 00000125 | OK |
| 11 | TypeA | 0033 | 00000126 | OK |
| 12 | TypeA | 0033 | 00000119 | NG |
| 13 | TypeA | 0033 | 00000111 | OK |

FIG.17

| UNAUTHENTICABLE DATA ARRAY |
|---|
| 00000117 |
| 00000119 |
| 00113120 |
| EOF |

IMAGE FORMING APPARATUS AND CONTROL METHOD OF IMAGE FORMING APPARATUS

BACKGROUND OF THE INVENTION

1. Field of the Invention

The present invention relates to an image forming apparatus which has an energy-saving mode, a normal mode, and a control method thereof.

2. Description of the Related Art

In the conventional image forming apparatus, an authentication is performed by an identification (ID) card which stores a user's identification information, and the user who is correctly authenticated is allowed to use the image forming apparatus. Accordingly, the apparatus can be managed and security is enhanced.

For purposes of saving energy, the image forming apparatus includes an energy-saving mode (also referred to as power-saving mode or sleep mode) for shutting down electric power supply to some parts of the image forming apparatus. When user authentication is performed under the energy-saving mode, the image forming apparatus recovers from the energy-saving mode to the normal mode. (For instance, see Japanese Patent Application Laid-Open No. 2006-47765)

In a technique discussed in Japanese Patent Application Laid-Open No. 2006-47765, since a controller of an image forming apparatus main body performs the user authentication after detecting an ID card, a power supply to the controller needs to be maintained even during the energy-saving mode. As a result, further power saving cannot be achieved.

Another power savings issue can arise if user authentication fails. For example, if the image forming apparatus only performs detection of the ID card under the energy-saving mode, the image forming apparatus recovers from the energy-saving mode to the normal mode in response to detection of the ID card and then performs the user authentication using an external authentication apparatus after recovering to the normal mode. In this example, there is no power use issue if the authentication succeeds since the user will be allowed to operate the image forming apparatus. In the event the user authentication fails, since the image forming apparatus still needed to recover from the energy-saving mode, unnecessary power is consumed until the image forming apparatus shifts back to the energy-saving mode.

In addition, components of the image forming apparatus which have an upper limit for a number of activations will uselessly consume their lifetime because the image forming apparatus unnecessarily recovers from the energy-saving mode. Such components include, but are not limited to, a hard disk (HDD), a relay which turns electric power supply on/off in a power supply unit, and a fuse used in the power supply unit.

SUMMARY OF THE INVENTION

The present invention is directed to an image forming apparatus which can reduce useless power consumption and avoid shortening the lifetime of components with an upper limit for a number of activations by preventing the image forming apparatus from unnecessarily recovering from an energy-saving mode.

According to an aspect of the present invention, an image forming apparatus which includes a plurality of components includes a power supply unit configured to supply power to the plurality of components, wherein the power supply unit includes a first power mode and a second power mode, wherein the second power mode supplies less power than the first power mode, a control unit configured to control which power mode the power supply unit is to use, a first authentication unit, to which power is supplied from the power supply unit while in the second power mode, wherein the first authentication unit performs a first user authentication when an authentication request has been received in the second power mode, and a sending unit configured to send a request signal to request the control unit to shift the power supply unit to the first power mode when the first authentication unit has succeeded in the first user authentication, wherein the control unit controls the power supply unit to shift from the second power mode to the first power mode upon receipt of the request signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of card information stored in a card.

FIG. 13 is illustrates an example of user information stored in a card.

FIG. 14 illustrates an example of an authenticable data array stored in an authentication server in an exemplary embodiment of the present invention.

FIG. 15 illustrates an example of an unauthenticable data array, as another condition example of a first authentication.

FIG. 16 illustrates an example of a history of authentication result to be used for creation of a first authentication condition, as another condition example of a first authentication.

FIG. 17 illustrates an example of an unauthenticable data array to be used for a first authentication, as another condition example of a first authentication.

DESCRIPTION OF THE EMBODIMENTS

Various exemplary embodiments, features, and aspects of the invention will be described in detail below with reference to the drawings.

Figure 1:
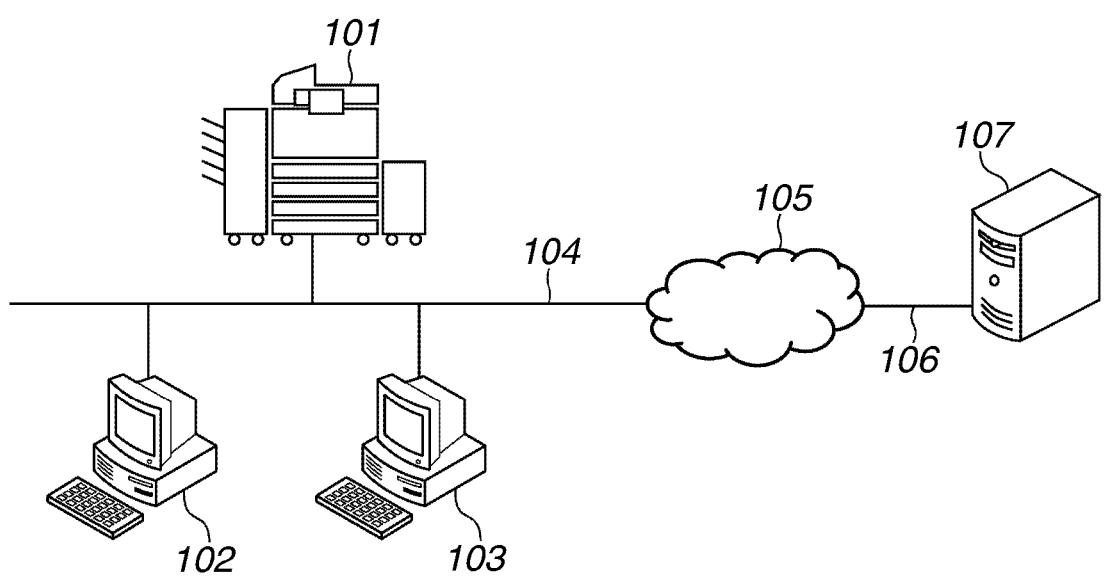
FIG. 1 illustrates an example of a configuration of a system including a multifunction peripheral (MFP) in an exemplary embodiment the present invention.

FIG. 1 illustrates an example of a system configuration including a multifunction peripheral (MFP) which is an example of an image forming apparatus in the present exemplary embodiment.

An MFP 101 is a multifunction image forming apparatus provided with functions of a copy, a scanner, a FAX, a printer and the like. Client personal computers (PCs) 102 and 103 can send print jobs to the MFP 101, and receive scanned data from the MFP 101. A local area network (LAN) 104 is a network in which the MFP 101, the client PCs 102 and 103 are connected to each other. The LAN 104 uses a system, for instance, Ethernet® or the like, and can send/receive data to/from apparatuses connected to another LAN via the MFP 101, client PCs 102 and 103, and Internet network 105.

An authentication server 107 is a server for authenticating a user who uses the MFP 101, and sends/receives data to/from the MFP 101 via the LAN 106 and the Internet network 105. User information (e.g., user code) is sent from the MFP 101 to the authentication server 107, and the authentication server 107 performs the authentication by checking the user information with authentication information stored in the authentication server 107. An authentication result is sent from the authentication server 107 to the MFP 101.

A method for the MFP 101 to obtain the user information includes a method for inputting the user information from a button provided in the MFP 101, and a method for inputting the user information from the ID card which the user owns via an ID card reading device. The authentication server 107 may be connected to the LAN 104 rather than the LAN 106.

Figure 2:
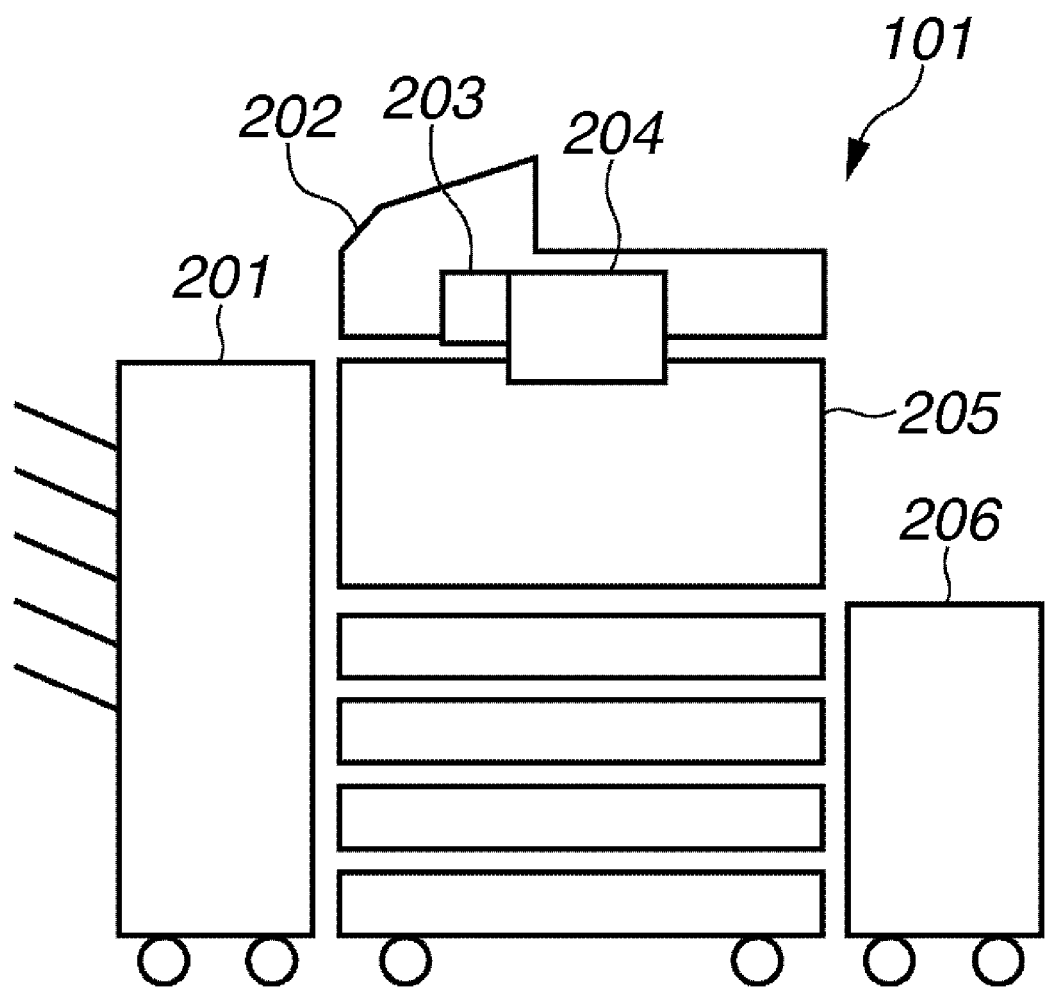
FIG. 2 illustrates an example of an appearance of an MFP in an exemplary embodiment of the present invention.

FIG. 2 illustrates an example of an appearance of the MFP 101. A document reading unit 202 optically reads a document and generates image data of the document. A sheet feeding unit 206 stores sheets of recording medium, and the user can add the sheets. A printer unit 205 prints an image on the sheet, and at the time of printing, transfers a toner image on the sheet conveyed from the sheet feeding unit 206 to fix it using a fixing device. The sheet(s) containing the printed image is discharged to a sheet discharging unit 201.

An operation unit 204 includes a button for the user to input an instruction to the MFP 101, and a display element such as a liquid crystal display which displays a status of the MFP 101 and an operation menu. Alternatively, the operation unit 204 may include a touch panel. A card reader unit 203 reads information stored in the ID card (not shown). The card reader unit 203 may have a function for writing data to the ID card.

Figure 3:
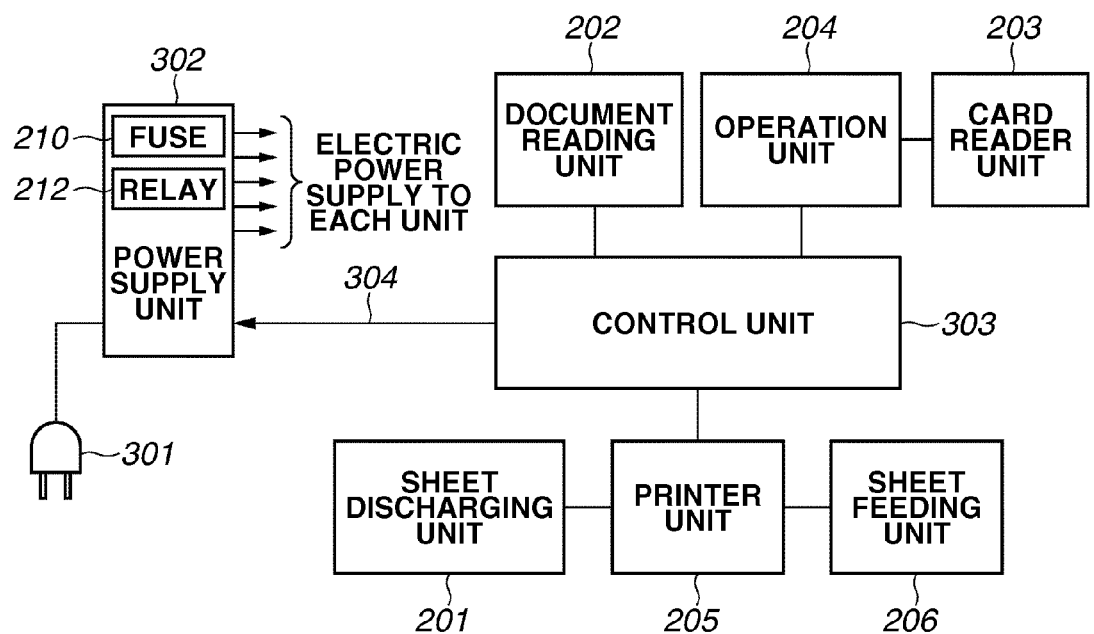
FIG. 3 is a block diagram illustrating an example of a hardware configuration inside an MFP in an exemplary embodiment of the present invention.

FIG. 3 is a block diagram illustrating an example of a hardware configuration inside the MFP 101. A plug 301 is used to plug into an outlet of a commercial alternating current (AC) power supply, and supplies AC power to a power supply unit 302. The power supply unit 302 supplies the power to each unit within the MFP 101. The power supply unit 302 converts the AC voltage to suitable voltage for each unit, and converts an AC current to a direct current (DC), as the need arises, depending on the unit receiving the power.

A fuse 210 and a relay 212 are provided inside the power supply unit 302. When an overcurrent or a short-circuit current flows within the power supply unit 302, an internal fuse element of the fuse 210 is fused or shut off. Accordingly, the fuse 210 protects the power supply unit 302 or each unit of the MFP 101 to which the power supply unit 302 supplies the power. The relay 212 serves as a switch for supplying or cutting off the power from the power supply unit 302 to each unit inside the MFP 101.

Both the fuse 210 and the relay 212 are devices which have a lifetime dependent on a number of times power is turned on or off. A fuse lifetime, for example, is dependent on a lifetime of a fuse element which deteriorates due to a rush current generated each time power is turned on. A relay lifetime, for example, is depending on a lifetime of contacts. A control unit 303 performs control of each unit within the MFP 101, and performs control regarding processing and transfer of electronic data. A power supply control signal line 304 transmits a power supply control signal to the control unit 303 to control on/off of an output of the power supply unit 302.

The MFP 101 has a normal operation mode in which the power is supplied to each unit included within the MFP 101, and an energy-saving mode (may be referred to as power-saving mode, or sleep mode) in which power consumption is reduced by not supplying the power to some units. There is a limit in the number of times the MFP 101 can shift between the energy-saving mode and the normal mode before performance of the units of the MFP 101 begins to degrade. Accordingly, it is desirable that the number of times of the shifting is kept to a minimum.

In the MFP 101 of the present exemplary embodiment, the power supplied to the document reading unit 202, the sheet discharging unit 201, the printer unit 205, and the sheet feeding unit 206 is shutdown in the energy-saving mode in order to reduce the power consumption. Further, for the control unit 303 and the operation unit 204, the power supply unit 302 supplies power to only some elements of the control unit 303 and operation unit 304 and shuts down the power to other elements.

In the energy-saving mode, an element within the control unit 303 to which the power is supplied is a circuit which detects a trigger event for recovering from the energy-saving mode to the normal mode. The trigger event includes detection of insertion of the ID card, detection of FAX reception, detection of a print job received via a network, detection of a button operation in the operation unit 204 and the like.

When the MFP 101 is in the energy-saving mode, for a user who puts the ID card to be read or a user who operates a button in the operation unit 204 in order to use the MFP 101, it is desirable that the operation unit 204 becomes usable as soon as possible. However, it may take a few seconds to several tens of seconds until the operation unit 204 becomes usable depending on software or hardware which controls the operation unit 204.

Figure 4:
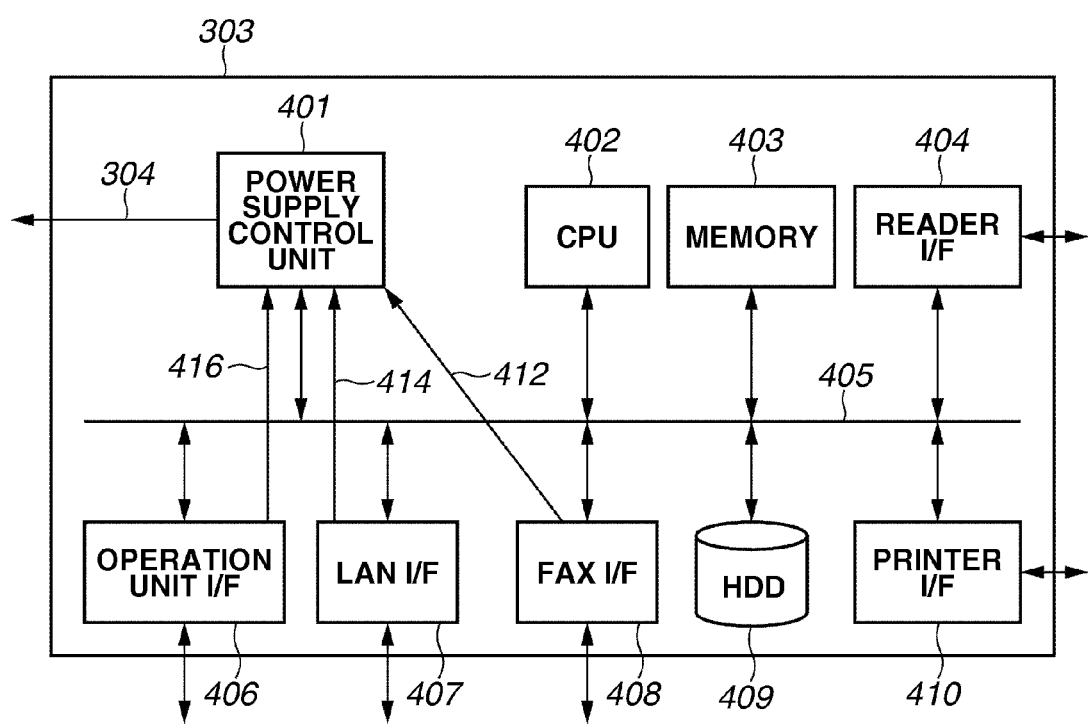
FIG. 4 is a block diagram illustrating an example of a hardware configuration of a control unit of an MFP in an exemplary embodiment of the present invention.

FIG. 4 is a block diagram illustrating an example of a hardware configuration of the control unit 303.

A central processing unit (CPU) 402 executes processing in the control unit 303. The CPU 402 executes a program loaded on a memory 403.

An internal bus 405 is a bus for the CPU 402 to communicate with each block within the control unit 303.

A hard disk (HDD) 409 stores programs (operating system (OS) and application programs and the like) which the CPU 402 executes. Further, the HDD 409 stores job data and image data. Job data refers to data for the MFP 101 to execute functions, such as page description language (PDL) data for print processing received via a LAN interface (I/F) 407, for instance, from the client PCs 102 and 103. The HDD 409 is an example of a device which has a lifetime dependent on a number of times of turning on the power.

A reader I/F 404 is an interface which delivers and receives a command, a status, and image data by communicating with the document reading unit 202. A printer I/F 410 is an interface which delivers and receives a command, a status, and image data by communicating with the printer unit 205. A FAX I/F 408 is an interface which is connected to a public telephone line to perform communication of FAX images. The LAN I/F 407 is connected to a network such as Ethernet® to deliver and receive job data, a command, and a status.

An operation unit I/F 406 is an interface which performs communication with the operation unit 204, and performs sending of data to be displayed on a display unit 504, and reception of input information from a user using, for example, a button and a touch panel. The power supply control unit 401 is a block which controls the shift between the normal mode and the energy-saving mode of the MFP 101. The power supply control unit 401 sends or changes the power supply control signal transmitted to the power supply unit 302 via the power supply control signal line 304 so that the MFP 101 shifts from the normal mode to the energy-saving mode based on a command from the CPU 402.

In the energy-saving mode, the power supply control unit 401 monitors start signals transmitted via activation signal lines (412, 414, and 416) from the operation unit I/F 406, the LAN I/F 407, and the FAX I/F 408. If a change occurs in the start signal, the power supply control unit 401 sends or changes the power supply control signal so that the MFP 101 recovers from the energy-saving mode to the normal mode. The power supply unit 302 supplies or stops the power to units included in the MFP 101 according to the power supply control signal.

Figure 5:
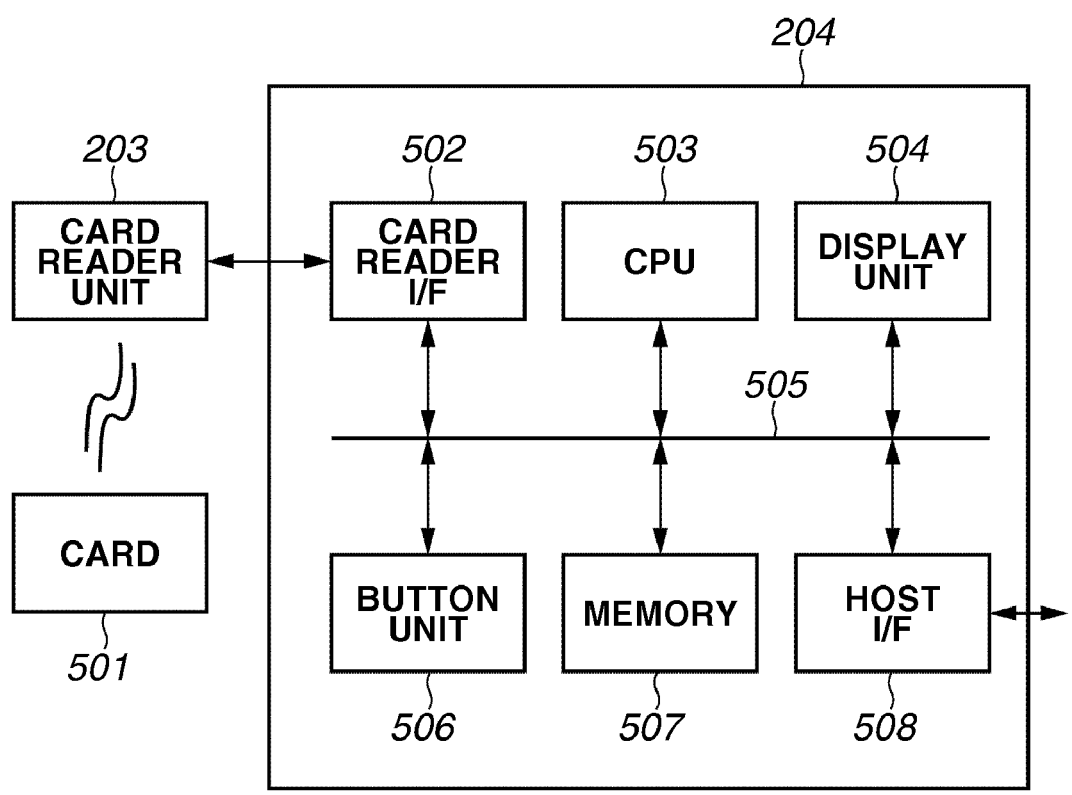
FIG. 5 is a block diagram illustrating an example of a hardware configuration of an operation unit of an MFP in an exemplary embodiment of the present invention.

FIG. 5 is a block diagram illustrating an example of a hardware configuration of the operation unit 204. A CPU 503 executes a program utilizing a memory 507 as a working area to control the entire operation unit 204.

The memory 507 is a storage unit which includes a non-volatile program memory and a rewritable temporary memory. The program memory stores a program which the CPU 503 executes. The rewritable temporary memory is used as the working area of the CPU 503.

The display unit 504 displays data received from the control unit 303 via a host I/F 508 on a liquid crystal display (LCD) provided in the display unit 504. A button unit 506 includes a press button or a touch panel overlaid on the LCD on the display unit 504. Upon detecting an operation (e.g., press) of the button unit 506, the CPU 503 sends information indicating detection of the operation to the control unit 303 via the host I/F 508.

The card reader unit 203 is connected to a card reader I/F 502. The card reader unit 203 is controlled by the CPU 503 and performs sending/receiving of data to/from a card 501 (ID card, etc.).

Each block within the operation unit 204 is connected to an internal bus 505.

In the energy-saving mode, the CPU 503 does not supply the power which has been supplied from the power supply unit 302 to the operation unit 204 to the display unit 504 for purpose of reduction of power consumption. The CPU 503 controls shutting off of a backlight of the liquid crystal display of the display unit 504. In the present exemplary embodiment, a processing capability of the CPU 503 and a memory capacity of the memory 507 are designed based on a limited specification to reduce the power consumption.

Figure 6:
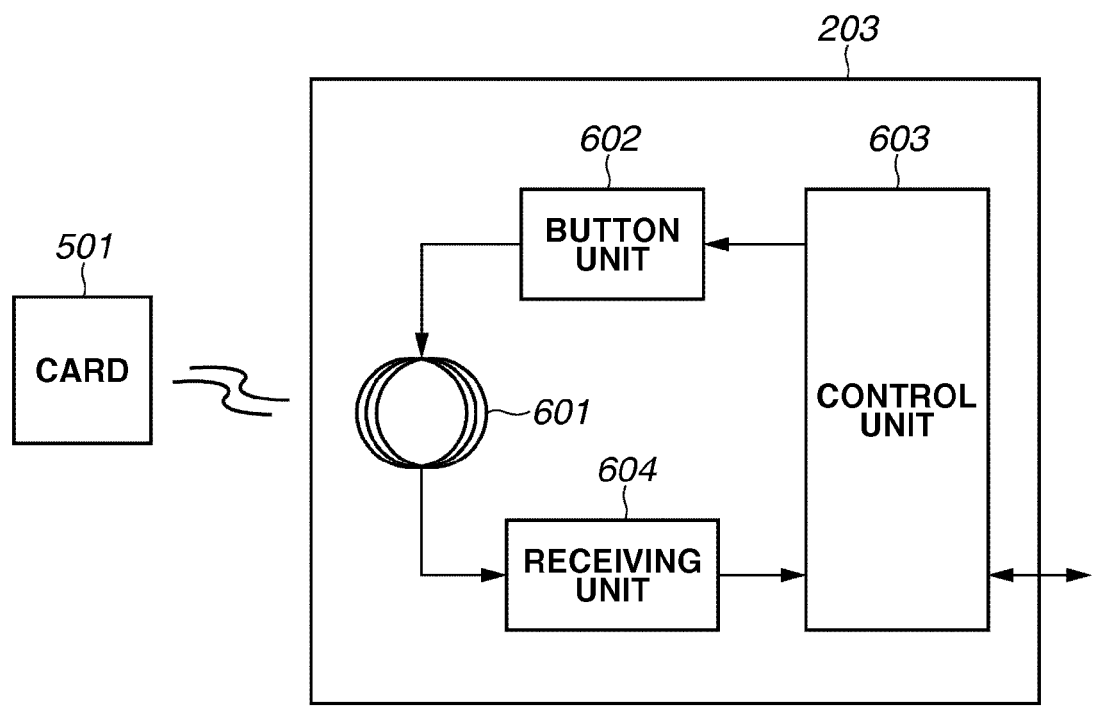
FIG. 6 is a block diagram illustrating an example of a hardware configuration of a card reader unit in an exemplary embodiment of the present invention.

FIG. 6 is a block diagram illustrating an example of a hardware configuration of the card reader unit 203 which is an example of a medium information reading unit. A control unit 603 controls a sending unit 602, a receiving unit 604, and an antenna 601, based on control by the CPU 503 of the operation unit 204, and performs sending/receiving of data to/from the operation unit 204.

The sending unit 602 converts sending data into a signal suitable for the antenna 601. The receiving unit 604 converts a signal which the antenna 601 has output into receiving data. The antenna 601 converts a signal input from the sending unit into an electromagnetic wave. If the card 501 is a non-contact type card in which a battery is not incorporated, the antenna 601 generates a magnetic field for supplying the power to the card 501. Further, the antenna 601 converts the electromagnetic wave output by the card 501 into a signal, and outputs the converted signal to the receiving unit 604.

The card reader unit 203 of the present exemplary embodiment is assumed to be a card reader which reads non-contact type IC card. However, a card reader which reads a contact type IC card, or a magnetic recording type card reader may be used.

Figure 7:
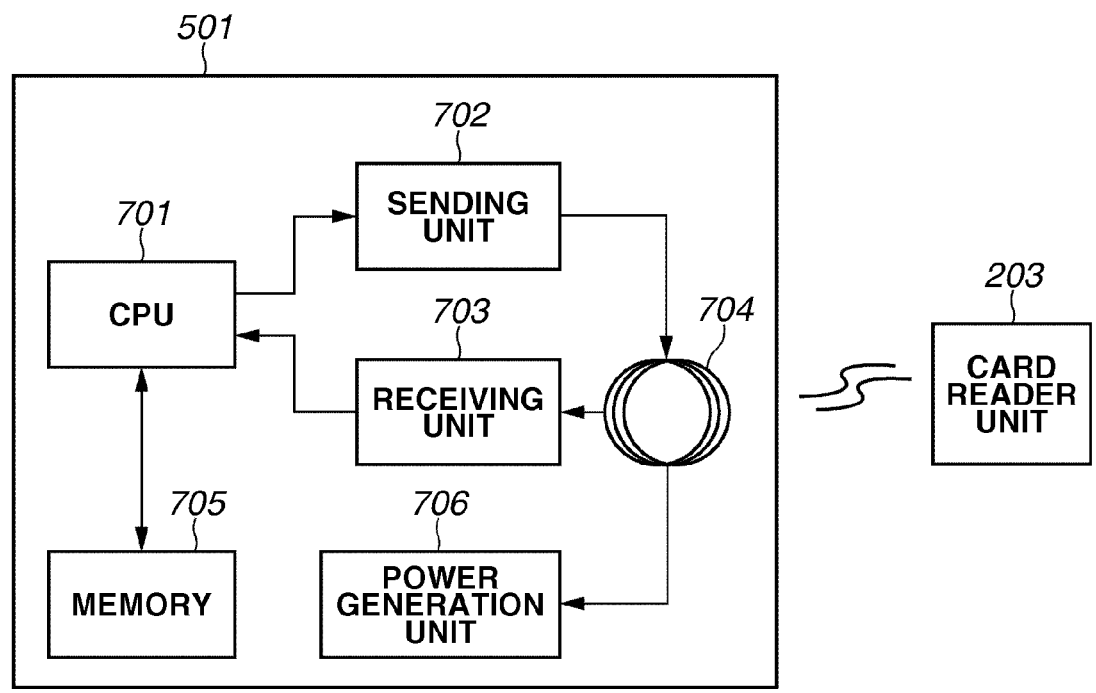
FIG. 7 is a block diagram illustrating an example of a hardware configuration of a card in an exemplary embodiment of the present invention.

FIG. 7 is a block diagram illustrating a hardware configuration of an ID card 501 (hereinafter, may be referred to as a card).

A CPU 701 performs control inside the card and communication with the card reader unit 203. When the CPU 701 receives data from the card reader unit 203, analysis of command and storage of the received data into the memory 705 are performed by the control of the CPU 701. When the CPU 701 sends data to the card reader unit 203, transfer of the data stored in the memory 705 to the sending unit 602 is performed by the control of the CPU 701 according to contents of a received command.

The memory 705 is a rewritable non-volatile memory, and a program code of the CPU 701, user information, and card information are stored therein.

The sending unit 702 converts sending data into a signal suitable for an antenna 704. The antenna 704 converts a signal input from the sending unit into an electromagnetic wave. Further, the antenna 704 receives an electromagnetic wave sent from the card reader unit 203, and the receiving unit 703 converts a signal output by the antenna 704 into receiving data.

In the present exemplary embodiment, the card 501 is a non-contact type card in which a battery is not incorporated, and a power generation unit 706 may generate power to be used in the card 501. A magnetic field generated in the card reader unit 203 is converted again into electric energy by the antenna 704, and further converted into DC constant-voltage by the power generation unit 706.

FIG. 12 illustrates an example of card information stored in the card 501 in the present exemplary embodiment. The card information includes a card type, a name of vendor which produces the card, a serial number which is a specific number assigned by the card vendor, and a version number of a program installed in the card. These values are usually written in the card when the card is shipped from the card vendor.

FIG. 13 illustrates an example of user information stored in the card 501 in the present exemplary embodiment. A group code is a value for identifying a corporation or a group to which a user belongs. An organization code is a value for identifying a section of the corporations or the group to which the user belongs. The group code or the organization code is also referred to as a division code which is an example of division information which defines a division. An individual code is an ID value for identifying a user individual. These values are written into the card according to an environment where it is used, after the card has shipped from the vendor who produces the card.

Next, processing for shifting the MFP 101 from the normal mode to the energy-saving mode, and processing for shifting the MFP 101 from the energy-saving mode to the normal mode will be described.

Figure 8:
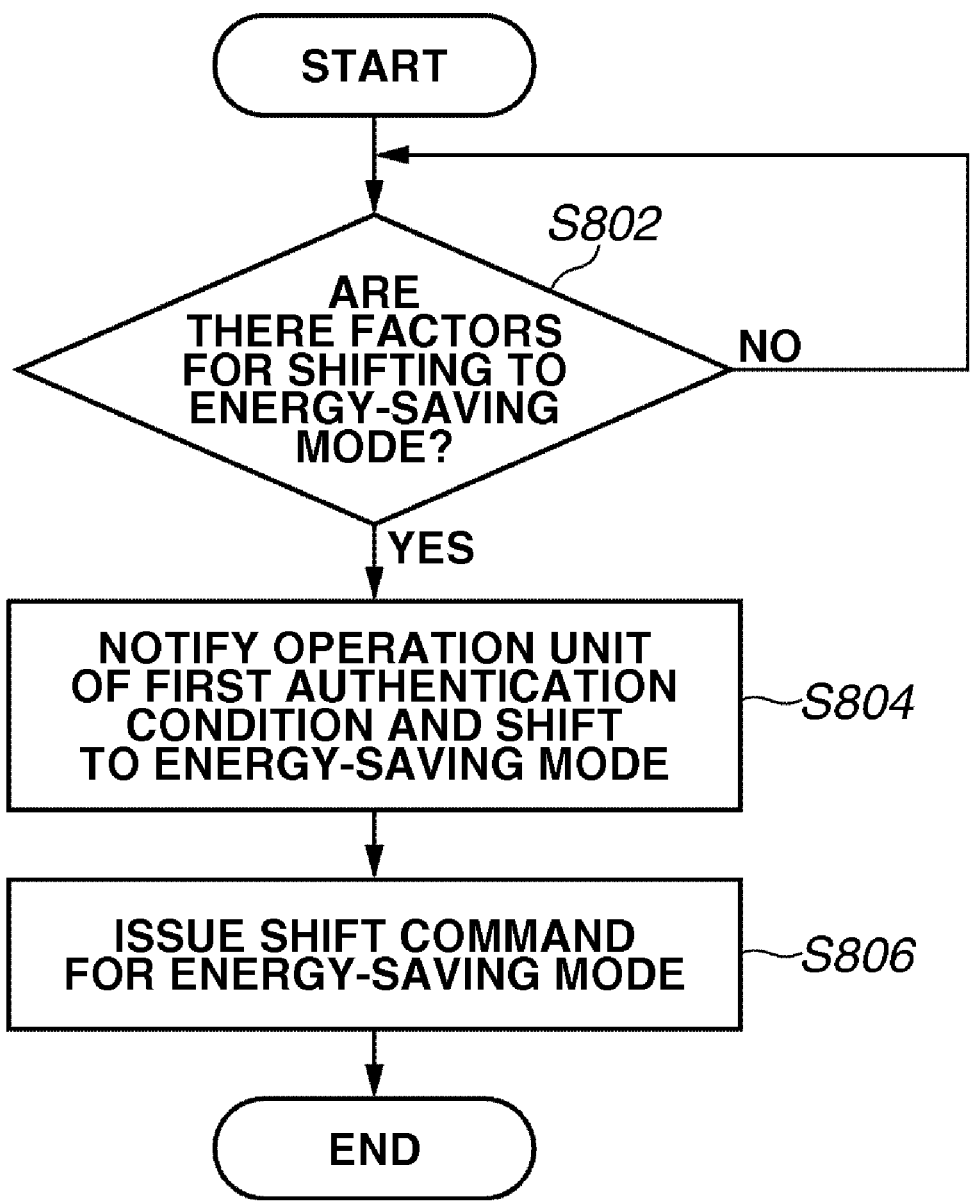
FIG. 8 is a flowchart illustrating an example of processing for shifting an MFP from a normal mode to an energy-saving mode.

FIG. 8 is a flowchart illustrating an example of processing in which the MFP 101 in the normal mode shifts to the energy-saving mode. The processing in the flowchart is executed by the CPU 402 which is included in the control unit 303 of the MFP 101.

While the MFP 101 is operating in the normal mode, execution of the flowchart starts. First, in step S802, the CPU 402 determines whether there are factors for shifting to the energy-saving mode. In the present exemplary embodiment, the factors for shifting to the energy-saving mode include but are not limited to, when the button unit 506 of the operation unit 204 is not operated for a specified time, when predetermined time is arrived, a request for shifting to the energy-saving mode is input by a user's operation of the operation unit 204, etc.

If there is the factor for shifting to the energy-saving mode (YES in step S802), the processing proceeds to step S804, and the CPU 402 notifies the operation unit 204 of the shifting to the energy-saving mode and sends a first authentication condition. The first authentication condition will be described in detail below.

In step S806, the CPU 402 issues an energy-saving mode shift command to the power supply control unit 401. Based on the energy-saving mode shift command issued to the power supply control unit 401, the power supply control unit 401 sends a power supply control signal to the power supply unit 302 via the power supply control signal line 304. The power supply unit 302 stops the electric power supply to some units in the MFP 101 based on the received power supply control signal. Thus, the MFP 101 shifts to the energy-saving mode, and the processing in the flowchart is terminated.

During the energy-saving mode of the present exemplary embodiment, the power is supplied to the operation unit 204 and the card reader unit 203. Further, in the control unit 303, the power is supplied to a part of the operation unit I/F 406, a part of the LAN I/F 407, and a part of the FAX I/F 408, and the power supply is stopped to the other parts. The power supply to the document reading unit 202, the sheet discharging unit 201, the printer unit 205, and the sheet feeding unit 206 is stopped. It is only necessary that the energy-saving mode is in a status in which its power consumption amount is less than that of the normal mode. To which units the power will be supplied, and to which units the power supply will be stopped may be different from the present exemplary embodiment.

A first authentication and a second authentication in the present exemplary embodiment will now be described. When there is a request for the user authentication by the ID card during the energy-saving mode, the MFP 101 will not immediately shift to the normal mode, but the operation unit 204 performs a first user authentication (hereinafter, referred to as a first authentication). Only if the first authentication has succeeded, will the MFP 101 shift to the normal mode. Then, a second user authentication (hereinafter, referred to as a second authentication) is executed. If the first authentication has not succeeded, the MFP 101 maintains the energy-saving mode, and does not shift to the normal mode.

In order to perform the first authentication, the CPU 503 of the operation unit 204 stores authentication condition and authentication data in the memory 507 in advance, and performs the authentication by checking the authentication condition and authentication data with the card information and the user information obtained from the card 501. In step S804 of FIG. 8, in order to enable the operation unit 204 to execute the first authentication during the energy-saving mode, the CPU 402 of the control unit 303 notifies the operation unit 204 of the authentication condition for performing the first authentication. Then, in steps S1004 and S1006 of the flowchart of FIG. 10, as will be described below, the operation unit 204 stores the notified authentication condition.

In order to reduce the power consumption in the energy-saving mode, processing speed of the CPU 402 of the operation unit 204 and the memory capacity of the memory 507 is limited. Therefore, all of the authentication condition and an authenticable data array which the authentication server 107 includes cannot be stored in the memory 507. Further, the operation unit 204 cannot perform all the authentication processing which the authentication server 107 performs. In the energy-saving mode, since the operation unit 204 cannot send and receive data to and from the authentication server 107 via the LAN I/F 407, the operation unit 204 also cannot perform the authentication processing using the authentication server 107 without recovering to the normal mode.

Therefore, in the first authentication, unnecessarily shifting the MFP 101 to the normal mode when the processing speed of the CPU 503 of the operation unit 204 and the capacity of the memory 507 are limited can be avoided.

If the first authentication has succeeded, when the MFP 101 shifts to the normal mode and it can communicate with the authentication server 107 via the network, the MFP 101 requests the authentication server 107 to perform user authentication. In the present exemplary embodiment, this is referred to as a second authentication.

In the present exemplary embodiment, a condition of an authentication performed by the authentication server 107, namely, a condition (condition 1) of the second authentication will be described as follows.

<Condition 1>
A card type (kind of card) is equal to Type A, and,
a group code is equal to 0033, and,
an individual code is equal to an authenticable data array.

The condition in the first authentication performed by the operation unit 204 is a condition which relaxes the condition of the second authentication. For instance, as an example which relaxes the above-described condition 1, a condition (condition 2) for the first authentication will be described as follows.

<Condition 2>
A card type (kind of card) is equal to Type A, and,
a group code is equal to 0033.
A condition expression indicated in the condition 2 includes two AND conditions, namely, the condition that the card type is equal to Type A, and the condition that the group code is equal to 0033. The condition that the individual code is equal to the authenticable data array, included in the condition 1, is omitted in the condition 2.

Therefore, a data array which represents an individual code to which the authentication is permitted does not need to be stored in the memory 507 of the operation unit 204, so that the memory capacity can be saved. In particular, it is more effective when the data amount of the data array which indicates the user code to which the authentication is permitted is large.

When the user authentication is attempted using a different type of ID card, or using an ID card on which a correct division code is not recorded, it will fail in the first authentication. In such a case, the shift from the energy-saving mode to the normal mode will not be performed, thus preventing an unnecessary recovery from the energy-saving mode.

If the first authentication has succeeded, the MFP 101 recovers from the energy-saving mode to the normal mode, and the second authentication is performed in the control unit 303. Processing of the second authentication will be described below.

Figure 9:
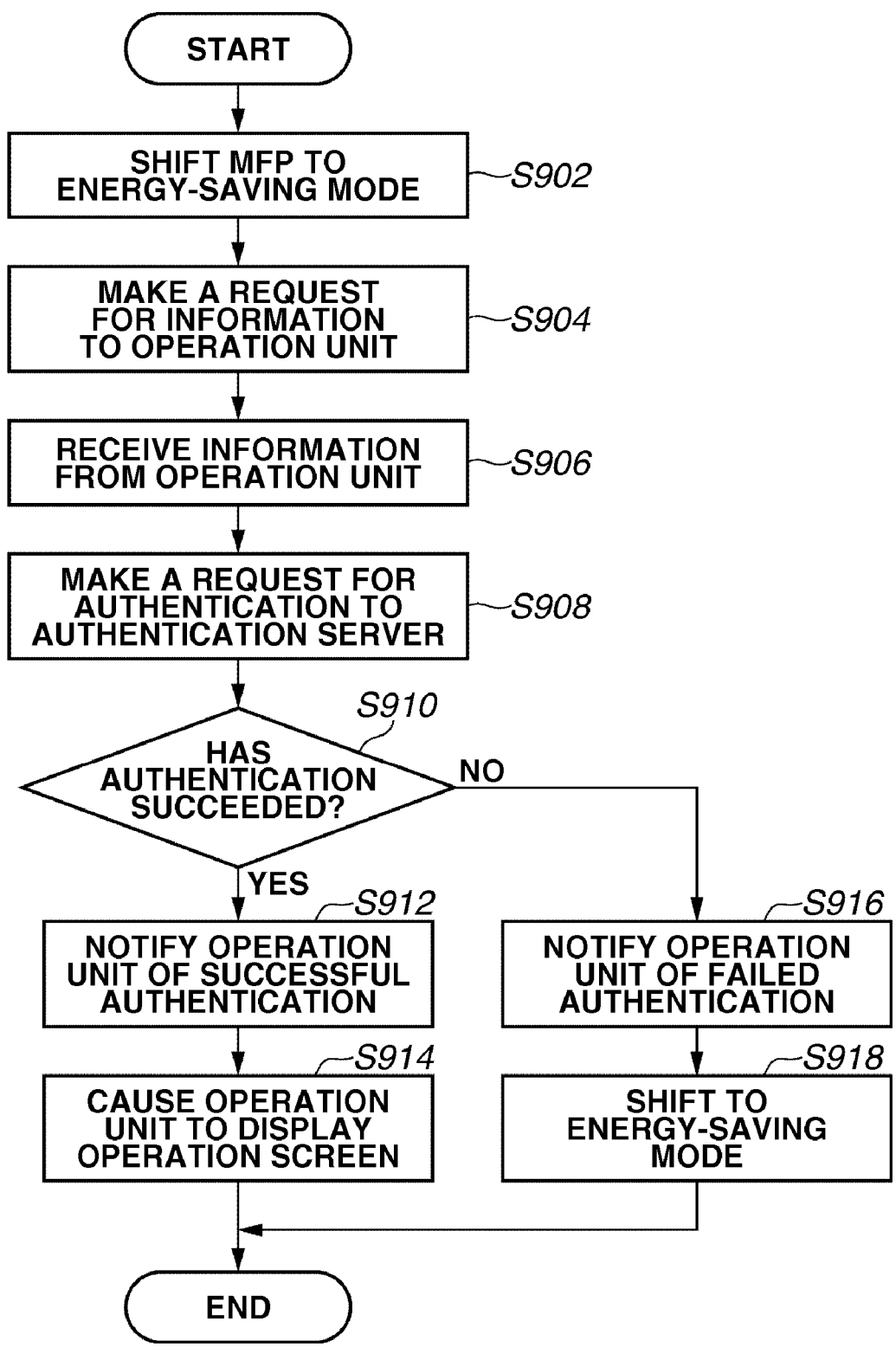
FIG. 9 is a flowchart illustrating an example of processing for recovering an MFP from an energy-saving mode.

FIG. 9 is a flowchart illustrating an example of processing of recovery from the energy-saving mode of the MFP 101 and the user authentication. The processing in the flowchart is executed by the CPU 402 which is included in the control unit 303 of the MFP 101.

The processing of the flowchart is started based on a request for the recovery from the energy-saving mode that has been received from the operation unit 204. The power supply control unit 401 is notified of the recovery request via the host I/F 508 of the operation unit 204 and the operation unit I/F 406 of the control unit 303. Then, the power supply control unit 401 supplies the power to the control unit 303, so that each device within the control unit 303 is activated, and the CPU 402 starts to execute the processing in the flowchart. Processing until the operation unit 204 issues the recovery request to the control unit 303 will be described below.

In step S902, the CPU 402 initializes each unit inside and outside the control unit 303 and shifts the MFP 101 to the normal mode. By shifting from the energy-saving mode to the normal mode, the lifetime of components which have an upper limit in the number of activations will be consumed by one time.

Then, in step S904, the CPU 402 requests the operation unit 204 for the card information and the user information stored on the card 501. In step S906, the CPU 402 receives the card information and the user information sent from the operation unit 204 in response to the request.

Then, in step S908, the MFP 101 requests the authentication server 107 to perform the user authentication by sending the card information and the user information thereto. The authentication server 107 performs the authentication processing by checking the card information and the user information sent from the MFP 101 with the authentication condition and the authentication data stored in the authentication server 107, and determines whether the user authentication has succeeded or failed. Then, the authentication server 107 sends back a determination result to the MFP 101. The processing in the MFP 101 in step S908 and the authentication processing in the authentication server 107 correspond to the second authentication in the present exemplary embodiment. The authentication server 107 determines whether the authentication has succeeded or failed based on the above-described condition 1.

In step S910, the CPU 402 checks a result of the user authentication sent back from the authentication server 107. If the authentication has succeeded (YES in step S901), the processing proceeds to step S912. If the authentication has failed (NO in step S901), the processing proceeds to step S916.

In step S912, the CPU 402 notifies the operation unit 204 that the user authentication has succeeded, and causes the display unit 504 of the operation unit 204 to display that the user authentication has succeeded. Then, in step S914, the CPU 402 causes the display unit 504 of the operation unit 204 to display a normal operation menu, puts it into a state in which a user can operate the MFP 101, and the processing in the flowchart is terminated.

If, in step S910, the authentication has failed (NO in step S910), then in step S916, the CPU 402 notifies the operation unit 204 that the user authentication has failed, and causes the display unit 504 of the operation unit 204 to display that the user authentication has failed. Then, in step S918, the CPU 402 shifts the MFP 101 to the energy-saving mode again, and the processing in the flowchart is terminated.

Figure 10:
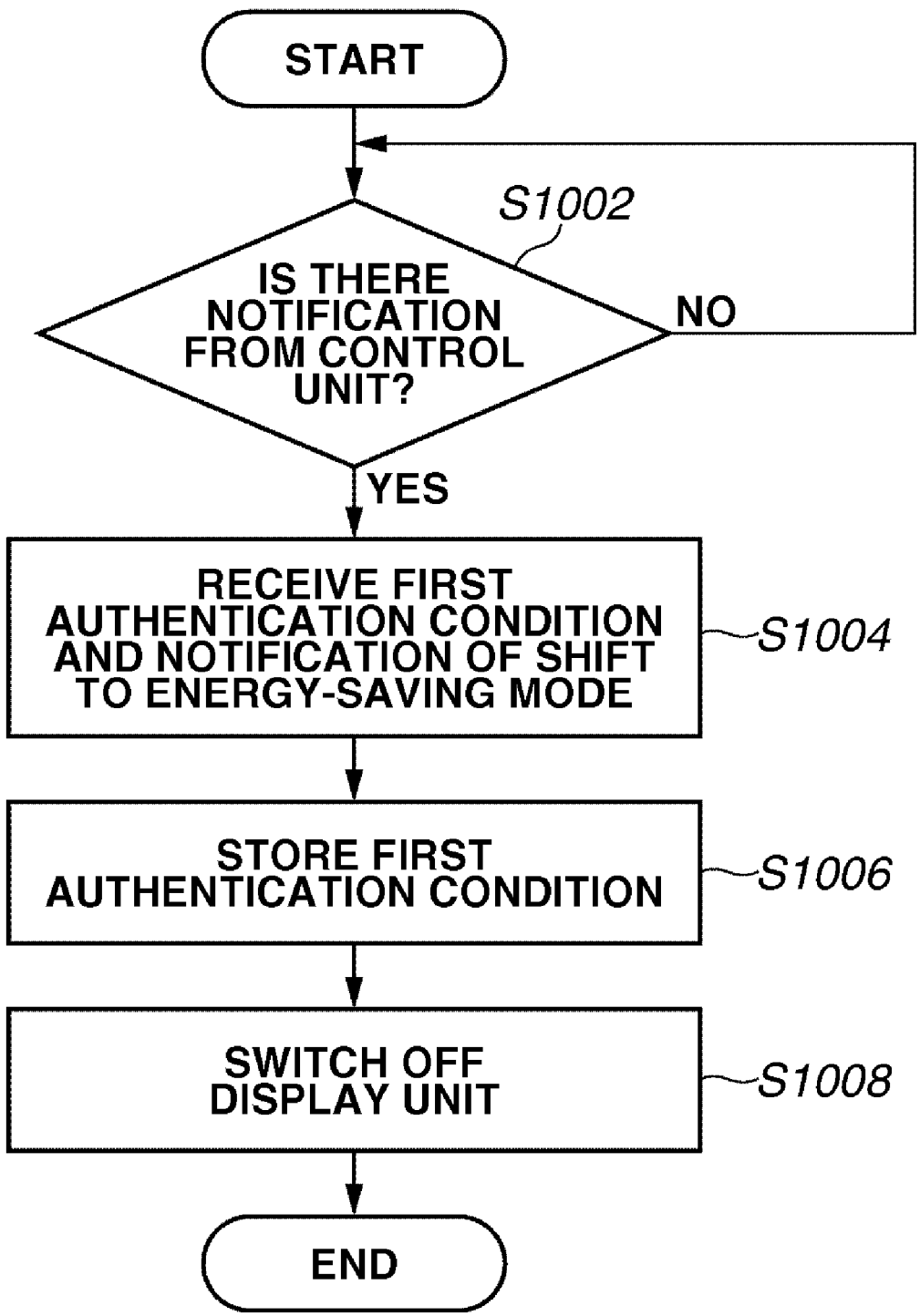
FIG. 10 is a flowchart illustrating an example of processing of an operation unit when an MFP shifts to an energy-saving mode.

FIG. 10 is a flowchart illustrating an example of processing in the operation unit 204 when the MFP 101 shifts to the energy-saving mode. The processing in the flowchart is executed by the CPU 503 of the operation unit 204. While the MFP 101 is in the normal mode execution of the processing in the flowchart begins.

In step S1002, the CPU 503 waits to receive notification from the control unit 303. If there is notification (YES in step S1002), the processing proceeds to step S1004. In step S1004, the CPU 503 receives the first authentication condition and notification of shifting to the energy-saving mode via the host I/F 508 from the control unit 303. In this case, the notification corresponds to the notification sent from the control unit 303 in step S804 of the flowchart of FIG. 8.

Then in step S1006, the CPU 503 stores the received first authentication condition in the memory 507. Then, instep S1008, the CPU 503 switches off the backlight of the liquid crystal display of the display unit 504, and the processing in the flowchart is terminated. In parallel with the processing in the flowchart, the MFP 101 will shift from the normal mode to the energy-saving mode.

Figure 11:
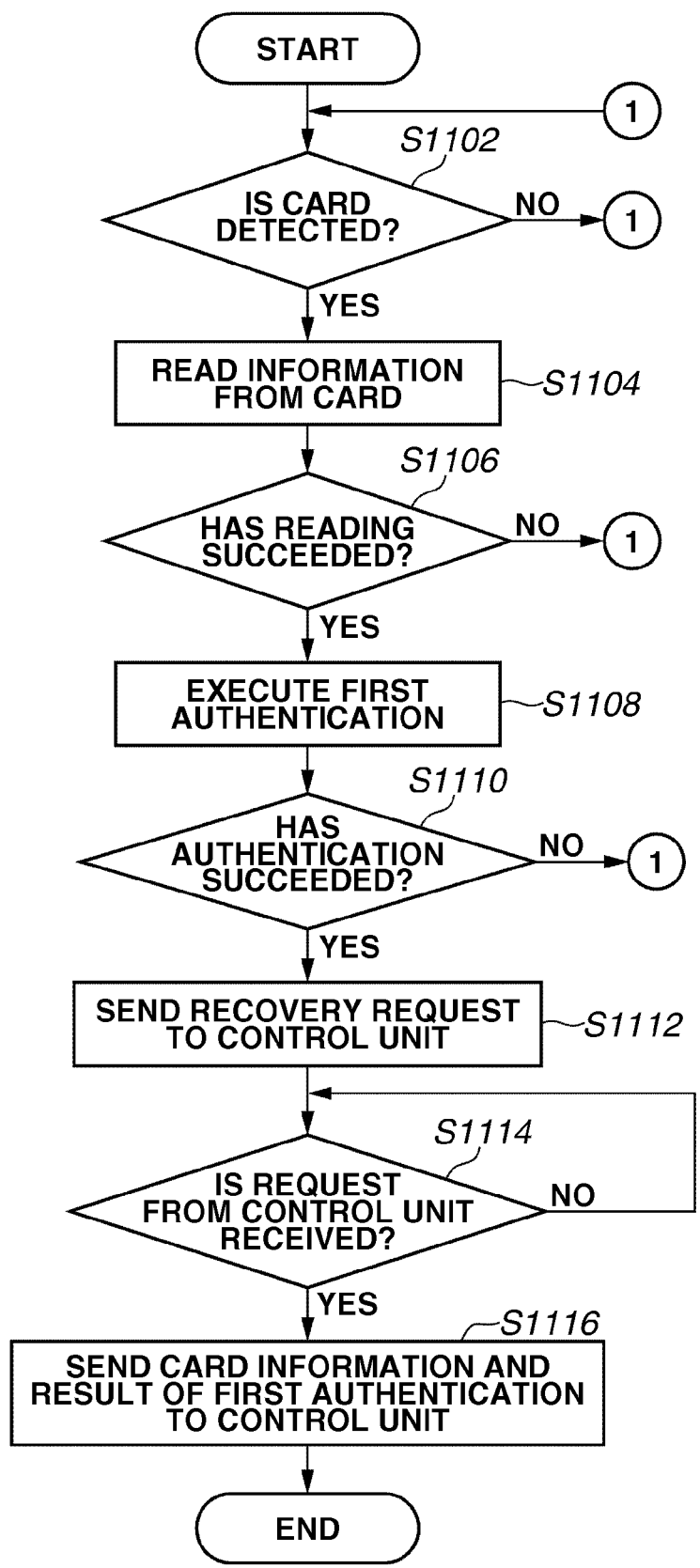
FIG. 11 is a flowchart illustrating an example of processing for sending of a recovery request from an energy-saving mode in an operation unit during an energy-saving mode, and a first authentication processing.

FIG. 11 is a flowchart illustrating an example of processing of sending of a request for recovery from the energy-saving mode and the first authentication processing in the operation unit 204 under the energy-saving mode. Ina state after the execution of the processing in the flowchart of FIG. 10, the execution of the processing in the flowchart of FIG. 11 is started.

In step S1102, the CPU 503 determines whether the card 501 is detected. Upon supplying the power to the antenna 601 of the card reader unit 203, if the card 501 is present in the vicinity, the CPU 503 issues a command to the card 501 to send a response. If the response has not been obtained (NO in step S1102), it is determined that the card 501 could not be detected. If the response has been obtained (YES in step S1102), it is determined that the card 501 could be detected. Based on the detection of the card 501, the CPU 503 determines that there is a request for the user authentication using the card.

In step S1104, upon determining that there is a request for the user authentication, the CPU 503 issues a command to the card 501 to send card information and user information, and reads out the card information and the user information sent from the card 501 as the response. Then, in step S1106, the CPU 503 determines whether the card information and the user information have been successfully read. If it is determined that the information from the card has been successfully read (YES in step S1106), the processing proceeds to step S1108. If it is determined that the information has not successfully been read, the processing returns to step S1102.

In step S1108, the CPU 503 performs the first authentication. More specifically, the CPU 503 checks the card information and the user information read in step S1104 with the first authentication condition stored in the memory 507 in step S1004 of FIG. 10. Then, in step S1110, the CPU 503 determines whether the first authentication has succeeded. If it is determined that the first authentication has succeeded (YES in step S1110), the processing proceeds to step S1112. If it is determined that the first authentication has failed (NO in step S1110), the processing returns to step S1102.

In step S1112, the CPU 503 sends a recovery request signal to the control unit 303 for making a request for shifting (recovering) from the energy-saving mode to the normal mode. Therefore, the request signal is transmitted to the power supply control unit 401 of the control unit 303, and the processing in the flowchart of FIG. 9 is executed. Accordingly, the CPU 503 executes the processing for shifting the MFP 101 to the normal status.

When the MFP 101 is shifted to the normal status, a request for the card information and the user information is made from the control unit 303 according to the processing of step S904 of FIG. 9. If the CPU 503 receives the request (YES in step S1114), the processing proceeds to step S1116, and the CPU 503 sends the card information and the user information read in step S1104 to the control unit 303.

As described above, the MFP 101 is shifted from the energy-saving mode to the normal mode on the condition that the first authentication has succeeded on the card 501 detected by the operation unit 204 under the energy-saving mode. Accordingly, the MFP 101 can be prevented from erroneously recovering from the energy-saving mode, by, for instance, placing a wrong card to the card reader unit 203. Thus, unnecessary power consumption by the MFP 101 due to unnecessary recovery from the energy-saving mode can be prevented, and shortening the lifetime of components which have an upper limit in a number of activations can be avoided.

In the present exemplary embodiment, the condition 2 for the first authentication is assumed to be obtained by deleting the condition "the individual code is equal to the authenticable data array" from the condition 1 for the second authentication. The condition 2 may include conditions other than the above-described example. Other variations for the condition 2 will be described below. The condition 1 which is the authentication condition in the authentication server 107 is as described above.

Another condition (condition 3) for the first authentication will be described below.

<Condition 3>
A card type (kind of card) is equal to Type A, and,
a group code is equal to 0033, and,
an individual code is greater than 00000111, and,
an individual code is smaller than 00011240.

According to the condition 3, the condition is stricter than the condition 2 on the point of further checking whether a value of the individual code is in a certain range. By adding the condition for checking whether the value of the individual code is in a certain range, a consumption amount of the memory 507 can be reduced. However, the first authentication will be accepted (OK) on individual codes which are not included in the authenticable data array of FIG. 14 such as 00000113 and 00000114, although the second authentication will not be accepted (NG) on cards which include these individual codes.

Another condition (Condition 4) for the first authentication will be described as follows.

<Condition 4>
A card type (kind of card) is equal to Type A, and,
a group code is equal to 0033, and,
an individual code is not equal to unauthenticable data array.

The condition 4 can be implemented by storing a part of the authentication data which is not included in an authenticable data array in the memory 507 as an unauthenticable data array. The unauthenticable data array may include values which are not included in the authenticable data array, for instance, as illustrated in FIG. 14. FIG. 15 illustrates a sample of the unauthenticable data array. If a number of the unauthenticable data is small, this method has the effect of reducing a use amount of the memory 507.

The unauthenticable data array may not include all values which are not included in the authenticable data array. If there is detected a card which includes a value which is included neither in the authenticable data array used in the authentication server 107, or in the unauthenticable data array used in a first authentication unit, the first authentication unit will accept (OK) the user authentication, and it is determined as unacceptable (NG) by a second authentication unit.

The unauthenticable data array described in the condition 4 may not be fixed data, and may be dynamically changed based on a result of past user authentication. An example of dynamically generating the unauthenticable data based on the result of past user authentication will be described below.

FIG. 16 illustrates an example of a history of the authentication results to be used for creating the first authentication condition in the present exemplary embodiment. The CPU 402 of the control unit 303 adds authentication results to a history file stored in the HDD 409 in the process of the second authentication, by which the history will be accumulated. In this history, there are four cases in which the authentications have failed (NG) (records of Nos. 4, 6, 8, and 12), and three cases (records of Nos. 4, 6, and 12) among these are attributable to non-coincidence of individual codes.

FIG. 17 illustrates an example of the unauthenticable data array included in the first authentication condition in the present exemplary embodiment. The unauthenticable data array in this example is made up of only user codes which have failed in the authentication (NG) in the history. Since it is likely that a user who has failed authentication (NG) is present near the MFP 101 and will attempt the authentication again, a detection ratio of authentication failure (NG) can be improved. Further, authentication results under the normal mode may be added to the history. The more the number of histories is, the more the detection ratio of the authentication failure (NG) can be improved.

By utilizing the history of past authentication results, the detection ratio of the cards which fail in the first authentication can be improved while suppressing a capacity for the unauthenticable data array in small.

In the present exemplary embodiment, although an MFP which is a multifunction image forming apparatus is described as an example of an image forming apparatus, the present invention can be applied to an image forming apparatus, e.g., copy machine, facsimile apparatus, printer, etc., having a single function.

While the present exemplary embodiment is based on the premise of using a non-contact type IC card which does not include a battery, a non-contact type IC card which includes a battery may be used. Alternatively, a contact type IC card maybe used. In this case, the card reader 203 will use a contact type IC card reader.

The MFP 101 may be designed to perform the second authentication by itself without using the authentication server 107. In that case, the user authentication can be realized by the MFP 101 by providing functions and data that the authentication server 107 stores to perform the user authentication for the control unit 303.

As described above, according to the present exemplary embodiment, by utilizing the history of the past authentication results, the detection ratio of the cards which fail (NG) in the authentication by the first authentication unit can be improved while suppressing the capacity for the unauthenticable data array to be stored in the memory 507 in small. Therefore, the MFP 101 in the energy-saving mode can reduce a number of times of unnecessarily recovering to the normal mode so that the MFP 101 can avoid unnecessary consumption of electric power, and shortening a lifetime of components which have an upper limit in a number of activations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-301216, filed Nov. 26, 2008, which is hereby incorporated by reference herein in its entirety.

What is claimed is:

1. An image forming apparatus which includes a plurality of components, the image forming apparatus comprising:
a power supply unit configured to supply power to the plurality of components, wherein the power supply unit includes a first power mode and a second power mode, wherein the second power mode supplies less power than the first power mode;
a control unit configured to control which power mode the power supply unit is to use;
a first authentication unit, to which power is supplied from the power supply unit while in the second power mode, wherein the first authentication unit performs a first user authentication when an authentication request has been received in the second power mode; and
a sending unit configured to send a request signal to request the control unit to shift the power supply unit to the first power mode when the first authentication unit has succeeded in the first user authentication,
wherein the image forming apparatus is connected to an external authentication apparatus, and
wherein the control unit controls the power supply unit to shift from the second power mode to the first power mode upon receipt of the request signal and causes the external authentication apparatus to perform a second user authentication.

2. The image forming apparatus according to claim 1, wherein the control unit allows a user to use the image forming apparatus when the external authentication apparatus has succeeded in the second user authentication, and controls the power supply unit to shift to the second power mode when the external authentication apparatus has failed in the second user authentication.

3. The image forming apparatus according to claim 1, wherein the first authentication unit performs the first user authentication according to a first authentication condition and the external authentication apparatus performs the second user authentication according to a second authentication condition, and
wherein the first authentication condition is a part of the second authentication condition.

4. The image forming apparatus according to claim 3, wherein the first authentication unit receives authentication information from a storage medium storing the authentication information and determines whether the authentication information satisfies the first authentication condition, and
wherein the first authentication condition includes whether a type of the storage medium is a specific type, and the second authentication condition includes whether a type of the storage medium is the specific type and whether user information included in the authentication information is specific user information.

5. The image forming apparatus according to claim 3, wherein the first authentication unit receives authentication information from a storage medium storing the authentication information and determines whether the authentication information satisfies the first authentication condition, and
wherein the first authentication condition includes whether division information included in the authentication information is specific division information, and the second authentication condition includes whether the division information included in the authentication information is the specific division information and whether user information included in the authentication information is specific user information.

6. The image forming apparatus according to claim 1, wherein when the control unit controls the power supply unit to shift to the second power mode, the control unit sends a first authentication condition necessary for performing the first authentication to the first authentication unit.

7. The image forming apparatus according to claim 6, wherein the first authentication unit stores the first authentication condition.

8. The image forming apparatus according to claim 7, wherein the first authentication unit compares the stored first authentication information with authentication information from an external source to determine whether the first authentication has succeeded.

9. The image forming apparatus according to claim 1, further comprising:
an operation unit configured to receive a user operation at the image forming apparatus,
wherein the operation unit includes the first authentication unit.

10. The image forming apparatus according to claim 9, further comprising:
a storage medium information reading unit connected to the operation unit and configured to read authentication information from a storage medium storing the authentication information,
wherein the first authentication unit performs the first authentication using the authentication information read from the storage medium storing the authentication information.

11. The image forming apparatus according to claim 1, at least one of the plurality of components, has an operational lifetime dependent on a number of times power to the apparatus is turned on and off, and
wherein the power supply unit supplies power to the at least one of the plurality of components in the first power mode.

12. The image forming apparatus according to claim 11, wherein the at least one of the plurality of components is at least one of a relay, a fuse, or a hard disk.

13. A method for controlling an image forming apparatus which includes a plurality of components, a power supply unit configured to supply power to the plurality of components, wherein the power supply unit includes a first power mode and a second power mode, wherein the second power mode supplies less power than the first power mode, and a control unit configured to control which power mode the power supply unit is to use, the method comprising:
causing a first authentication unit supplied with power from the power supply unit while in the second power mode to perform a first user authentication when an authentication request has been received in the second power mode;
sending a request signal to request the unit to shift the power supply unit to the first power mode when the first authentication unit has succeeded in the first user authentication,
wherein the image forming apparatus is connected to an external authentication apparatus; and controlling the power supply unit to shift from the second power mode to the first power mode upon receipt of the request signal and causing the external authentication apparatus to perform a second user authentication.

14. A non-transitory computer-readable storage medium that stores a program for causing a computer to execute a method for controlling an image forming apparatus which includes a plurality of components, a power supply unit configured to supply power to the plurality of components, wherein the power supply unit includes a first power mode and a second power mode, wherein the second power mode supplies less power than the first power mode, and a control unit configured to control which power mode the power supply unit is to use, the program comprising:

causing a first authentication unit supplied with power from the power supply unit while in the second power mode to perform a first user authentication when an authentication request has been received in the second power mode;

sending a request signal to request the control unit to shift the power supply unit to the first power mode when the first authentication unit has succeeded in the first user authentication, wherein the image forming apparatus is connected to an external authentication apparatus; and controlling the power supply unit to shift from the second power mode to the first power mode upon receipt of the request signal and causing the external authentication apparatus to perform a second user authentication.

* * * * *